July 25, 1950     H. G. VORE     2,516,278
CAPPING MACHINE
Filed Nov. 9, 1944
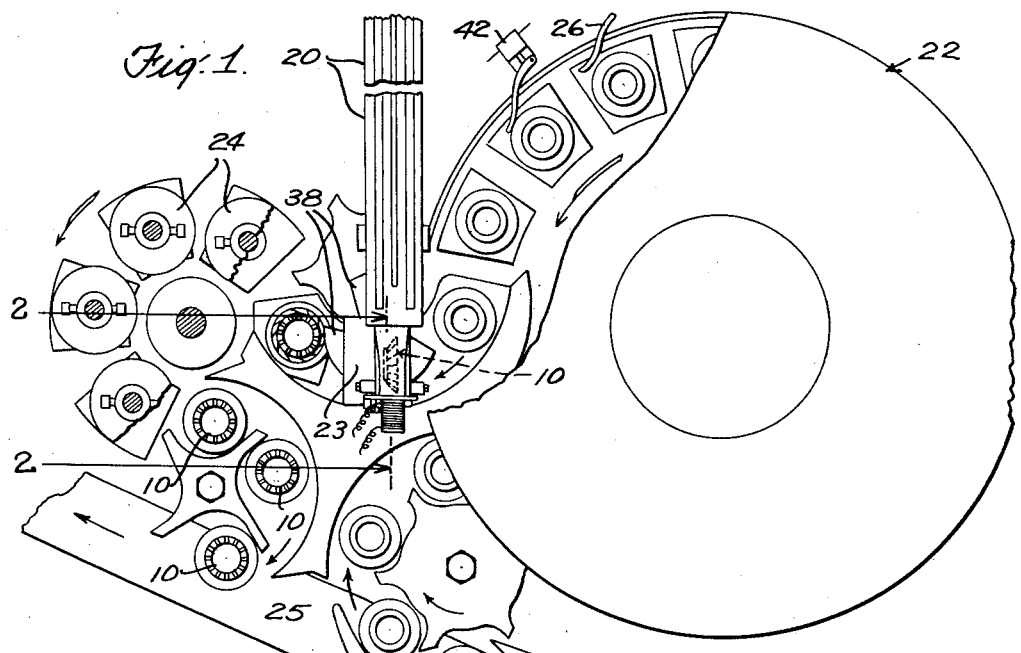
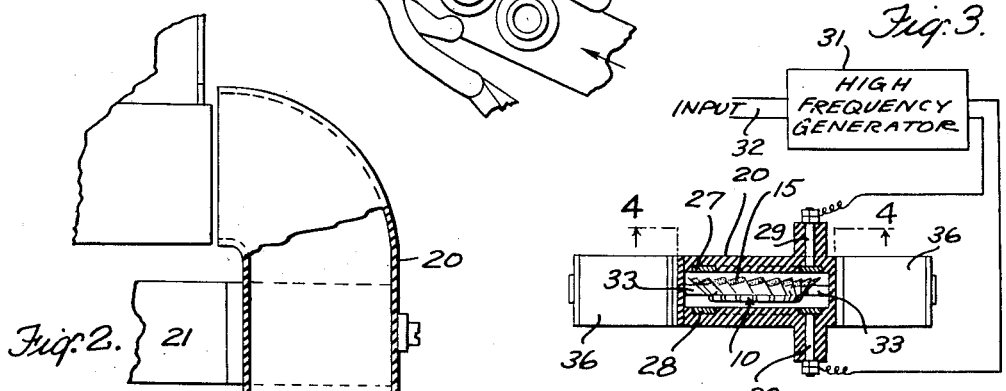
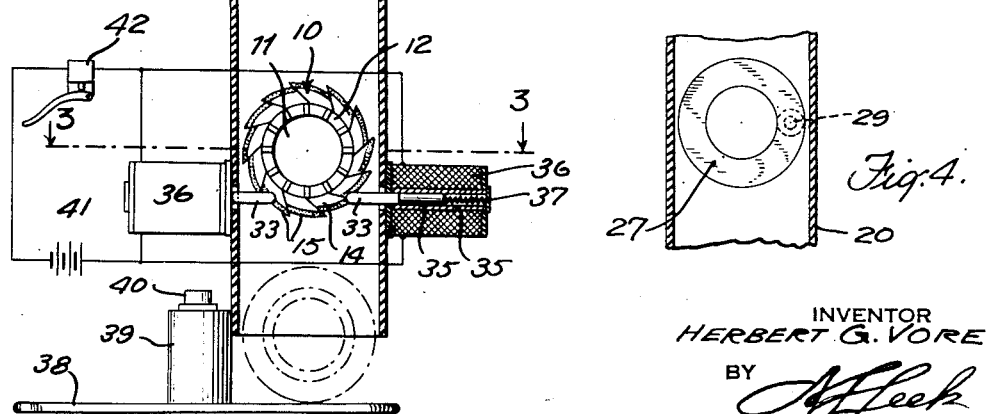
INVENTOR
HERBERT G. VORE
BY
ATTORNEY Patented July 25, 1950

2,516,278

UNITED STATES PATENT OFFICE 2,516,278

CAPPING MACHINE

Herbert G. Vore, Forest Hills, N. Y., assignor to American Seal-Kap Corporation of Delaware, Wilmington, Del., a corporation of Delaware Application November 9, 1944, Serial No. 562,703

4 Claims. (Cl. 226—83)

This invention relates to machines for applying to milk bottles, or the like, flexible skirted hood caps having a pleated skirt coated in whole or in part with a thermoplastic adhesive, and, more particularly, to a machine and method for heating the said adhesive to plasticizing temperatures by means of high frequency electrostatic fields.

The present invention is an improvement over capping machines of the general type disclosed in U. S. Patent 2,325,163 to Carl W. Goodwin and Harold W. Martin, wherein there is provided a magazine for a plurality of stacks of nested preformed caps which are arranged to be successively brought into operative position to feed the stacks of caps into a supply chamber, from which they are successively withdrawn by means of a picker mechanism, and are rolled along a feed chute on the lower edges of their skirts. The caps are fed by the chute to a capping station where they are held in position to be picked off by the horizontally advancing necks of successive milk bottles and to be carried thereby to a sealing station. The sealing station comprises a rotating turret having a plurality of sealing heads which are adapted to fold the skirts around the necks of the milk bottles and to hold the same under sealing pressure until the adhesive has cooled and set. The feed of the caps is so synchronized with respect to the feed of the milk bottles that preheated caps are successively fed to the capping station to meet the advancing milk bottles as they pass such station.

It is an object of the present invention to provide a capping machine of novel and improved character in which the caps, having a band of thermoplastic adhesive around the pleated skirt thereof, are exposed to the heating effect of high frequency electrostatic fields, thereby causing practically instantaneous heating of the said adhesive to plasticizing temperatures.

It is a further object of the present invention to provide a capping machine in which heating devices of substantial dimensions are dispensed with and are replaced by a pair of spaced electrodes, energized by a source of high frequency alternating potential, between which the caps have to pass during their progress from the magazine to the capping or sealing station.

It is also within the contemplation of the invention to incorporate high frequency electrostatic heating means into a capping machine, between two successive stations thereof, said heating means being so constructed and arranged as to generate heat only in the circumferential regions of the caps bearing a band of thermoplastic adhesive, while leaving the remaining portions of the caps substantially unheated.

The invention also contemplates a novel electrostatic high-frequency heating device and method for preheating caps bearing thermoplastic adhesive, which is very simple in construction, practically instantaneous in its operation, and which requires very little machine space so that it may be readily applied to capping machines of conventional construction without expensive structural changes.

Other and further objects and advantages of the invention will become apparent from the following description, taken in conjunction with the accompanying drawing; in which:

Fig. 1 is a top plan view, somewhat fragmentary in character, of a cap applying and sealing mechanism embodying the principles of the present invention;

Fig. 2 is a vertical sectional view taken on line 2—2 of Fig. 1;

Fig. 3 is a horizontal sectional view taken on line 3—3 of Fig. 2; and

Fig. 4 is a fragmentary sectional view taken on line 4—4 of Fig. 3.

Broadly stated, in accordance with the principles of the present invention, means are provided to produce a high frequency electrostatic field, such means being, for example, in the form of a pair of parallel spaced, insulatedly mounted metal electrodes or plates, between which the bottle caps to be heated are passed. A high frequency alternating voltage is applied to these electrodes, such voltage being obtained from any suitable source of high frequency electrical energy, such as a thermionic tube oscillator. The pair of electrodes with the cap therebetween constitute a condenser, the dielectric of which is largely concentrated in the cap. The dielectric losses in the body of the cap will quickly raise its temperature to a point where the band of thermoplastic adhesive around the pleated skirt thereof will be softened. The high frequency electrostatic heating means may be interposed between two successive stations of the capping machine and means may be provided for stopping the cap in between said stations and in cooperative relation with said electrodes for a short time, sufficient to heat the adhesive to the proper operating temperature. This heating to the desired temperature is further assisted by proper selection of the frequency of the source of high frequency energy, which in general should be of the order of several megacycles, and of the amount of high frequency power applied.

The caps 10 (Fig. 2) may be of the general type disclosed in the Patent to Herbert G. Vore, No. 2,325,163, dated July 27, 1943, which comprises a central diaphragm or closure portion 11, an annular pouring lip housing 12, and a fluted skirt 14, carrying a band of thermoplastic adhesive 15 on the outer surface thereof. A disc may be positioned within the recess formed by the diaphragm 11 and the pouring lip housing 12 for increasing the holding power of the cap when seated on the internal ledge of a milk bottle. Preferably, the condenser electrodes, between which the cap is exposed to the heating effect of a high frequency electrostatic field, are so formed as to concentrate the field to the portions of the cap bearing the band of thermoplastic adhesive, without appreciably heating the remaining portions of the cap. This may be obtained, for example, by providing the electrodes in the form of a pair of annular plates between which the adhesive-bearing portions of the cap may be stopped for a predetermined period. Thus, the heating effect of the high frequency field will be confined to the adhesive band, while the remaining portions of the cap remain substantially unheated. This is desirable not only for economy of operation, but also because it avoids softening of the impregnating materials, such as paraffin, which are generaly incorporated into the body of the cellulosic cap. In this manner, heating is confined to the region of the skirt of the cap bearing the thin layer of thermoplastic adhesive band, and, consequently, such heating may be obtained by relatively small amounts of high frequency energy and within a very short time, of the order of a fraction of a second.

Referring now more particularly to the drawing, a preferred embodiment of the invention will be described, in which the principles of the invention are applied to a capping machine of the type disclosed in the said U. S. Patent 2,325,163, and the high frequency electrostatic heating means are incorporated into the lower end of the feed chute, from which the preheated caps may drop onto a rotary stop plate, to be picked off by the necks of advancing milk bottles. Of course, the heating chute, forming part of the patented machine, in which the caps are rolled along the lower edge of their skirts and are exposed to the effect of radiant heat, is omitted, since the heating effect is produced directly at the end of the feed chute, as it will be explained more fully hereinafter.

In the drawing, reference character 20 denotes a feed chute of generally rectangular cross section, at least the lower terminal portions of which are constituted of dielectric material, such as Bakelite. The chute is held by means of a bracket 21, securing the same to the frame of the machine. The milk bottles are received by a suitable conveyor 25, passed through a filling machine 22 of standard construction wherein they are filled with milk, thence past the cap applying station 23 and to the capping heads 24, after which they are redelivered to the conveyor. The filling station 22 and the capping heads 24 form a part of the standard filling and capping apparatus, the details of which form no part of the present invention.

A suitable picker mechanism delivers caps to chute 20 from a magazine, synchronously with the milk bottles passing through the filling machine 22. Synchronism may be assured, for example, by means of a bottle-actuated electric contactor mechanism 26, which upon actuation by an advancing bottle will release a single cap from a magazine (not shown) and will cause the same to drop into the chute. In view of the fact that this picker mechanism and its bottle-actuated electrical control is fully disclosed in the said U. S. Patent 2,325,163 and does not form part of the present invention, no detailed description thereof will be necessary.

In the insulative side walls of the lower portion of chute 20, there are embedded a pair of annular metal plates 27 and 28, so that their exposed surface is flush with the inner surface of the chute. Metal rods 29 and 30, protruding through the walls of the chute, are connected to annular electrode plates 27 and 28, respectively, and constitute terminals through which the electrodes are connected to a high frequency generator 31. This generator may be of any suitable construction and generally comprises a thermionic tube oscillator energized from the alternating current power line 32.

Through the end walls of chute 20 protrude from opposite directions a pair of retractable stops 33, constituted of a dielectric material, having their outer ends connected with an armature 34 of similar dimensions, constituted of a ferromagnetic material, such as iron. Each of armatures 34 is slidably mounted in the cylindrical axial space 35 of a solenoid 36, against the pressure of a coil spring 37. It will be noted that stops 33 normally extend into the chute and will hold a bottle cap dropped thereinto between electrodes 27 and 28. Upon being energized, however, solenoids 36 will retract the stops and will permit the bottle cap to fall through the chute.

Spacedly mounted from the lower edge of chute 20, there is provided a rotary stop plate 38, having a central boss 39, rotatably mounted in a pin 40. This rotary stop plate, or wheel, the construction of which is more fully disclosed in the said U. S. Patent 2,325,163, is provided with three arms forming stop surfaces for the lower edges of bottle caps, and with spaces between said arms. The necks of advancing milk bottles from filling station 22 will enter the said spaces and will engage the arms of the rotary stop plate, thereby causing rotation thereof by 120 degrees per bottle. At the same time, the mouth portions of the bottles will pick off the preheated caps supported by the said plate.

Solenoids 36 are connected together and in series with a source of current 41, and are jointly under the control of a bottle-actuated electric contact 42, so that they are energized for a short period of time by the neck of each advancing bottle.

From the foregoing description, the operation of the machine of the invention will be readily understood by those skilled in the art. Milk bottles fed by one end of conveyor 25 are successively introduced into filling machine 22 and are filled with milk in the conventional manner. Upon being filled with milk, the advancing bottles pass contact lever 26 and will actuate the same, thereby actuating the picker mechanism to release a cap for each bottle, the said released cap being dropped into the upper end of chute 20. The released cap, however, will not be permitted to pass through the chute but will be stopped by stops 33 at the heating station, where the cap will be interposed between annular electrode plates 27 and 28, energized by high frequency generator 31. Exposed to the heating effect of the high frequency electrostatic field between the said electrodes, the cap will be rapidly heated to temperatures at which the band of thermoplastic adhesive around the pleated skirt thereof becomes plastic, such heating effect being substantially concentrated in the said band of adhesive by the annular shape of the electrodes. Upon further progress of the milk bottle, it will actuate electrical contact or switch 42, which will momentarily energize solenoids 36. These solenoids will retract their armatures 34 and stops 33 attached thereto, so that the preheated cap will be released and dropped against the upper surface of rotary stop plate 38, from where it will be picked off by the neck of an advancing bottle. The bottle, with the preheated cap thereon, will now arrive to the capping station 24, where appropriately constructed sealing heads will hold the cap under pressure until the adhesive will set. The sealed bottle is returned to conveyor 25 and is ready for shipment. Of course, the same procedure is repeated for each advancing bottle passing through the filling machine, each bottle releasing its own cap from the magazine by actuation of contact 26 for preheating at the high-frequency heating station, and releasing its preheated cap from the heating station to the cap-applying station 23 by the actuation of contact 42. In this connection, it may be pointed out that contacts 26 and 42 are preferably arranged at a distance from each other, slightly less than that of two successive bottles on the filling machine, so that the preheated cap is permitted to drop out from the heating station before a new, unheated cap is dropped into the chute. Thus, at all times only one cap will be present at the high-frequency heating station.

It will be noted that the present invention provides a number of important advantages. Thus, in prior machines of the described general type, preheating of the adhesive band was a relatively slow operation, the proper execution of which generally required the provision of a long heating tunnel and of a number of moving parts for passing the caps through such tunnel. This appreciably added to the complexity and to the overall dimensions of the machine. Also, upon starting the operation of the machine, a certain time interval had to elapse before the first cap has passed through the heating tunnel and was available at the cap-applying station in preheated condition. This circumstance has caused loss of time every time the machine was started and was found to be the source of inconvenience especially where it was necessary to handle a large number of relatively short "runs." In contrast to this, the high frequency electrostatic heating means of the invention may be installed at any convenient point between two stations, without adding to the dimensions of the machine. As the heating of the adhesive band on the bottle cap by means of high frequency electrostatic fields is extremely rapid, the preheating step does not appreciably add to the length of a complete operating cycle during which a cap picked from the magazine finally arrives to the sealing station. The machine and its high-frequency electrostatic heating means are at all times instantaneously ready for operation without any initial heating-up period. The energy requirements of the high frequency electrostatic heating means of the invention compare very favorably with those of prior machines.

It is also to be observed that in view of the great simplicity and small dimensions of the electrostatic heating means of the invention, they can be readily applied or added to existing equipment without requiring any expensive structural changes. Moreover, the principles of the invention permit localizing the preheating of the caps to the exact region where such heating is desired, such as the band of adhesive on the pleated skirt thereof, without appreciably heating other portions of the caps.

Although the present invention has been disclosed in connection with a preferred embodiment thereof, variations and modifications may be resorted to by those skilled in the art without departing from the principles of the invention. Thus, while the invention has been described and illustrated as applied to a capping machine of the type disclosed in the aforesaid Patent 2,325,163, it may be applied with obvious modifications to practically all capping machines of the same general class. All of these variations and modifications are considered to be within the true spirit and scope of the present invention, as disclosed in the foregoing description and defined in the appended claims.

What is claimed is:

1. In a machine for applying to containers and heat-sealing thereon preformed hood caps having foldable pleated skirts carrying a thermoplastic adhesive coating and having a dielectric character, the combination which comprises means advancing said caps in a succession along a path to a cap applying station, a pair of conductive plates disposed in a zone along said path and spaced for the passage of said caps therebetween, means for establishing a high frequency electrostatic field between said plates, means for individually introducing caps between said plates, means for holding said caps between said plates until the adhesive thereon is heated to heat-sealing temperatures, and means for releasing said holding means and delivering the preheated caps to said capping station and bottle-controlled means to actuate said releasing means.

2. In a machine for applying to containers and heat-sealing thereon preformed hood caps constituted of dielectric material and having a band of thermoplastic adhesive around the pleated skirt thereof, the combination which comprises a chute along which said caps advance to a capping station, a pair of metal plates disposed in a zone along said chute and spaced for the passage of said caps therebetween, means for setting up a high frequency electrostatic field between said plates, locking means for holding said caps in said chute between said plates until the adhesive-bearing portions of the caps and the adhesive thereon are heated to heat-sealing temperatures without appreciably raising the temperature of the remaining portions of the caps, and means for subsequently releasing said locking means and delivering the preheated caps to said capping station and bottle-controlled means to actuate said releasing means.

3. In a machine for applying to milk bottles and heat-sealing thereon preformed hood caps constituted of dielectric material and having a pleated skirt with a band of thermoplastic adhesive around the circumference thereof, the combination which comprises a chute having walls of insulating material, a pair of annular electrodes spacedly mounted in the walls of said chute, means for setting up a high frequency electrostatic field between said electrodes, bottle-controlled means for individually dropping caps into said chute, retractable locking means at the lower end of said chute to hold said caps between said electrodes and to heat the adhesive-bearing regions thereof to heat-sealing temperatures, and bottle-controlled means for retracting said locking means to deliver the preheated caps to a capping station.

4. In a machine for applying to bottles and heat-sealing thereon preformed hood caps constituted of cellulosic material and having a pleated skirt with a band of thermoplastic adhesive around the circumference thereof, the combination which comprises a chute having insulative walls and open at both ends thereof, a pair of annular flat electrodes spacedly mounted in the lower portion of said chute and flush with the inner surface of the chute, a high frequency generator connected to said electrodes and adapted to establish a high frequency electrostatic field therebetween, retractable insulative stop members normally extending through the walls of said chute below said electrodes to hold a cap dropped into the chute in cooperative relation with respect to said electrodes wherein the band of adhesive on the cap is interposed between the annular electrodes thereby to heat the adhesive to plasticizing temperatures, electromagnetic means for retracting said stop members, and bottle-actuated contactor means for energizing said electromagnetic means to release the preheated cap from the chute.

HERBERT G. VORE.

REFERENCES CITED

The following references are of record in the file of this patent:

UNITED STATES PATENTS

| Number | Name | Date |
|---|---|---|
| 2,231,457 | Stephen | Feb. 11, 1941 |
| 2,233,176 | Melton et al. | Feb. 25, 1941 |
| 2,296,948 | Pitman | Sept. 29, 1942 |
| 2,325,163 | Goodwin et al. | July 27, 1943 |